H. B. BAXTER.
BREAD CUTTER.
APPLICATION FILED MAR. 27, 1915.
1,185,466.
Patented May 30, 1916.
2 SHEETS—SHEET 1.
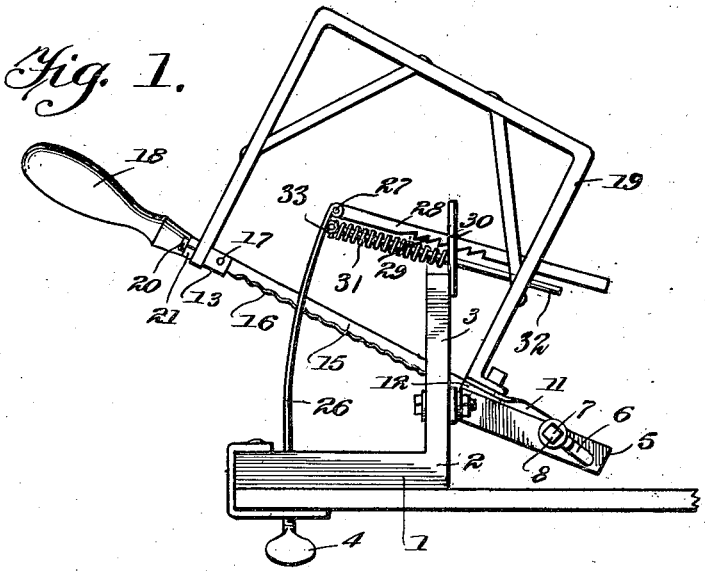
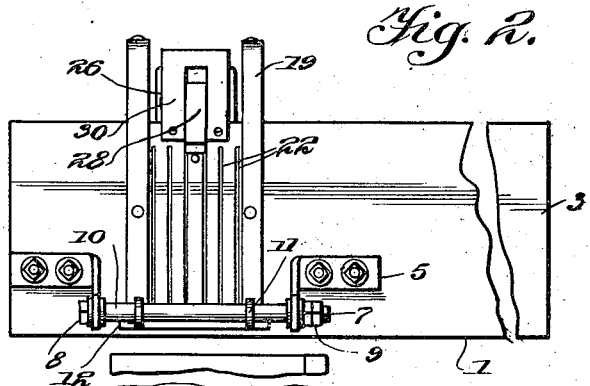
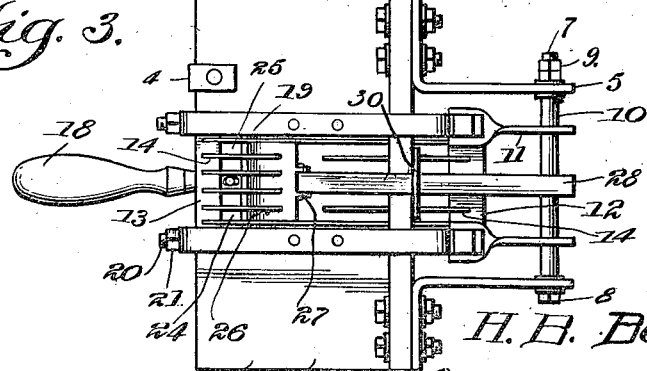
Witnesses
Frederick P. Moan
C. C. Hines
Inventor
H. B. Baxter
By Victor J. Evans
Attorney H. B. BAXTER.
BREAD CUTTER.
APPLICATION FILED MAR. 27, 1915.
1,185,466.
Patented May 30, 1916.
2 SHEETS—SHEET 2.
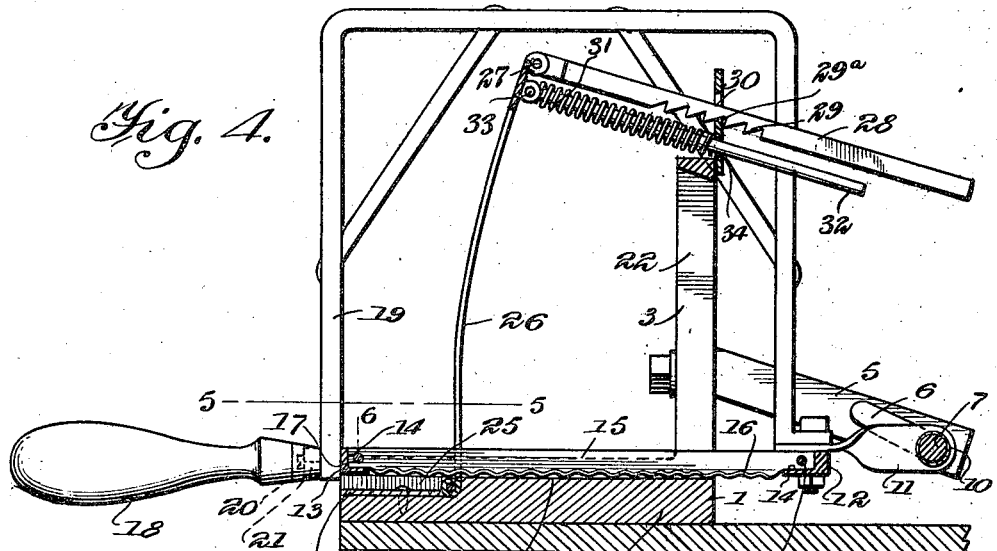
Fig. 4.
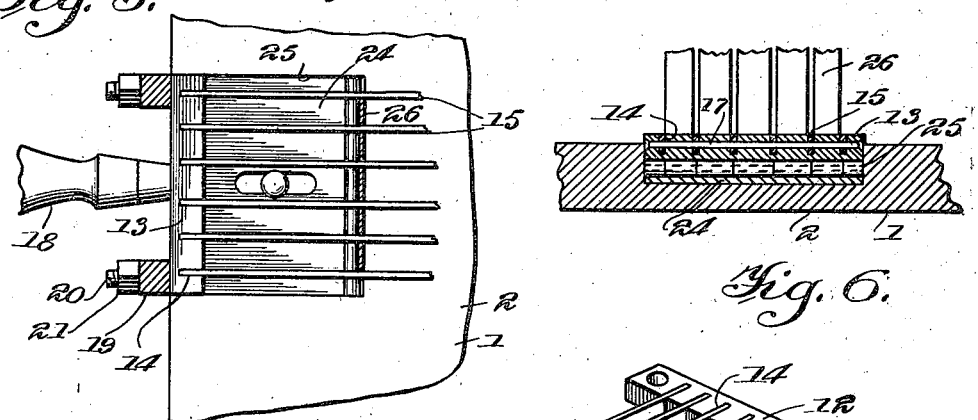
Fig. 5.
Fig. 6.
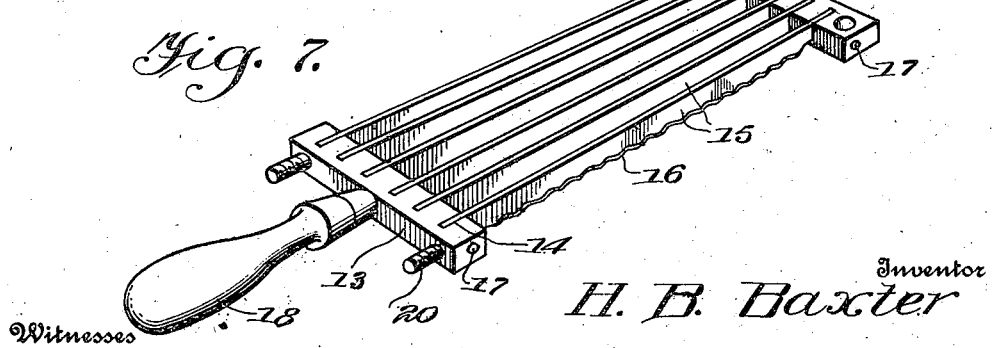
Fig. 7.
Witnesses
Inventor
H. B. Baxter
By Victor J. Evans
Attorney

UNITED STATES PATENT OFFICE.

HARRY BOWMAN BAXTER, OF NEWCOMERSTOWN, OHIO.

BREAD-CUTTER.

1,185,466.　　　　　Specification of Letters Patent.　　Patented May 30, 1916.

Application filed March 27, 1915. Serial No. 17,450.

*To all whom it may concern:*

Be it known that I, HARRY B. BAXTER, a citizen of the United States, residing at Newcomerstown, in the county of Tuscarawas and State of Ohio, have invented new and useful Improvements in Bread-Cutters, of which the following is a specification.

This invention relates to bread cutters, and one of its objects is to provide a bread cutter which may be secured to a shelf or table by means of which a plurality of slices of bread may be cut at a time.

Another object of the invention is to provide a construction by which the number of cutting knives employed may be varied.

Still another object is to provide a construction whereby an efficient downward and longitudinal cutting motion of the cutting device is secured.

A still further object is to provide means for clamping a loaf which is adjustable for different sizes of loaves in a ready and convenient manner.

The invention consists of the features of construction, combination and arrangement of parts herein fully described and claimed, reference being had to the accompanying drawings in which:—

Figure 1 is a side elevation of a bread cutter embodying my invention, showing a cutting device in elevated position. Fig. 2 is a rear elevation of the same. Fig. 3 is a top plan view. Fig. 4 is a vertical longitudinal section showing the cutter at the limit of its downward movement. Fig. 5 is a horizontal transverse section on the lines 5—5 of Fig. 4. Fig. 6 is a vertical transverse section on the line 6—6 of Fig. 4. Fig. 7 is a detail view of the cutting device disconnected from the base.

In carrying my invention into practice, I provide a base or supporting member 1, which consists of a bottom board or plate 2 and an upright back board or plate 3, which is rigidly secured to the bottom board or plate in any suitable manner. The board or plate 2 is provided with suitably clamping means 4 for attaching it to a bench or table.

Fixed to and projecting rearwardly from the rear surface of the upright board or plate 3 are bracket arms 5 provided with downwardly and rearwardly inclined slots 6, which slots receive the ends of a cross bolt 7 having at one end a head 8 and at the opposite end clamping and check nuts 9, said bolt being slidably and pivotally mounted in the said slot 6. Engaging the bolt between spacing sleeves 10 thereon are bracket arms 11, to which are fastened a transverse holding bar 12.

The bar 12 is arranged in parallel relation with a holding bar 13 arranged above the board or plate 1 and in advance of the upright board or plate 3. These holding bars are formed with grooves or notches 14 receiving the ends of a plurality of cutting knives 15, each having a fluted lower cutting edge 16. The ends of the knives are apertured and register with apertures in the bars, and through these apertures are passed rods or keys 17, whereby the knife blades are secured in position against displacement. This construction permits of the use of one or more blades, and the convenient attachment of the blades for cleaning, sharpening and other purposes, as will be readily understood.

To the bar 13 is attached the handle 18, disposed about midway of the length thereof, and secured to said bar and to the bar 12 are one or more yokes 19 which extend over the upright board or plate 3 and form with the cross bars a bow-frame to carry the cutting knives. The bar 14 is fastened to the depending front arms of the yokes by bolts 20 and set nuts 21, allowing said bar to be adjusted to rigidly stay the knives or to be disconnected from the frame yokes when occasion requires. The saws are movable through slots 22 cut through the upright board or plate 3 and downwardly into grooves 23 formed in the bottom board or plate 2.

It will be understood from the foregoing description that in cutting a loaf of bread into slices, the cutting device is raised upwardly at an angle to the extent afforded by the slots 22 to a point above the loaf of bread, which is rested upon the bottom board or plate 2 and against the upright board or plate 3, and the cutting device is then swung downwardly on its pivot and at the same time moved in a forward direction, by which the cutting knives are caused to pass downward through the bread, and at the same time to give a slicing action, by which a sharp and cleanly severance is affected. It will be evident that in this operation the loaf will be cut into as many slices as there are knives employed, and that in the reciprocating motion of the knives the supporting or pivot bolt 7 slides at an angle downward and rearward in the guide slots 6.

For the purpose of holding the loaf of bread which is to be cut in position, I provide a clamping device which is adjustable to receive and clamp leaves of different slices against the bottom and upright boards or plates. This clamping device consists of a plate 24 which is fitted and secured in a recess 25 in the front portion of the board or plate 2 and to which is hinged or pivoted the lower end of a clamping element consisting of a slotted spring metal plate formed of a series of spaced spring metal strips 26, which may be equal in number to the knives, which extend through and are movable in spaces between the same. The said clamping member is pivotally connected at its upper end, as at 27, to the rear end of an adjusting and holding bar 28, which bar 28 is provided with a series of notches or ratchet teeth 29 for engagement with a keeper lug or tooth 29ª in a slotted guide bracket 30 carried by the upright 3, whereby the bar may be secured in a variety of adjusted positions against the retractile energy of a coiled expansion spring 31. This spring 31 surrounds a guide rod 32 which is pivoted at one end, as at 33, to the upper end of the member 26 and is movable at its opposite end through a guide opening 34 in the guide bracket 30, the spring thus normally acting to retract or swing the clamping device 26 forwardly to a released position. The clamping device may, however be held in any one of a plurality of clamping positions, to clamp loaves of different sizes, by the holding action of the bar 29, the rod 32 serving both as a support for the spring and a means for guiding and maintaining the parts in proper relationship.

It will thus be evident that my invention provides a bread cutting device which may be easily and conveniently operated, by means of which a plurality of slices may be cut at a time, the number of slices varying as desired, which enables the cutting knives to be easily and conveniently removed for cleaning or repairs, which adapts the knives to cut downward as well as crosswise with the slicing cut, whereby a sharp cleanly cut will be effected, and which is also adapted to receive and clamp loaves of different sizes, the conveniences of which will be manifest.

I claim:—

A bread cutting apparatus including a support embodying a base and an upright, a slotted clamping member pivotally connected with the base for adjustment toward and from the upright, a locking member on the upright, an adjusting and retaining bar pivotally connected with the clamping member and notched to interlock with said locking member, a guide member pivotally connected with the clamp and in guided connection with the upright, and a spring acting on said guiding member to retract the clamping member when said bar is released from engagement with said locking member.

In testimony whereof I affix my signature in presence of two witnesses.

HARRY BOWMAN BAXTER.

Witnesses:
J. MYRON HAYS,
H. H. EAGON.